US009816551B2

(12) United States Patent
Regnier et al.

(10) Patent No.: US 9,816,551 B2
(45) Date of Patent: Nov. 14, 2017

(54) TURBOCHARGER DUAL BALL BEARING SYSTEM

(71) Applicant: Turbonetics Holdings, Inc., Moorpark, CA (US)

(72) Inventors: Brian G. Regnier, Redondo Beach, CA (US); Michal Hastings, Moorpark, CA (US); Hayden Austin, Ventura, CA (US)

(73) Assignee: Turbonetics Holdings, Inc., Moorpark, CA (US)

( * ) Notice: Subject to any disclaimer, the term of this patent is extended or adjusted under 35 U.S.C. 154(b) by 323 days.

(21) Appl. No.: 14/532,388

(22) Filed: Nov. 4, 2014

(65) Prior Publication Data

US 2015/0159690 A1      Jun. 11, 2015

Related U.S. Application Data

(60) Provisional application No. 61/900,088, filed on Nov. 5, 2013.

(51) Int. Cl.
| | |
|---|---|
| *F16C 19/54* | (2006.01) |
| *F01D 25/16* | (2006.01) |
| *F16C 25/08* | (2006.01) |
| *F16C 27/04* | (2006.01) |
| *F16C 19/16* | (2006.01) |
| *F16C 33/66* | (2006.01) |
| *F16C 35/077* | (2006.01) |

(52) U.S. Cl.
CPC .......... *F16C 19/547* (2013.01); *F01D 25/162* (2013.01); *F01D 25/164* (2013.01); *F16C 19/548* (2013.01); *F16C 25/083* (2013.01); *F16C 27/045* (2013.01); *F05D 2220/40* (2013.01); *F05D 2240/52* (2013.01); *F05D 2240/54* (2013.01); *F05D 2260/38* (2013.01); *F16C 19/163* (2013.01); *F16C 33/6659* (2013.01); *F16C 35/077* (2013.01); *F16C 2360/24* (2013.01)

(58) Field of Classification Search
CPC .... F16C 19/181; F16C 19/182; F16C 19/183; F16C 19/547; F16C 25/083; F16C 27/045; F16C 33/6659; F16C 2360/24; F05D 2240/52; F05D 2240/54; F05D 2260/38
See application file for complete search history.

(56) References Cited

U.S. PATENT DOCUMENTS 4,676,667 A * 6/1987 Komatsu .................. F01D 25/16
                                                         384/517
4,783,253 A * 11/1988 Ayres ........................ B09C 1/02
                                                         209/2

(Continued)

FOREIGN PATENT DOCUMENTS

| FR | 2569771 A1 | 3/1986 | |
|---|---|---|---|
| JP | 61134536 U | 8/1986 | |
| JP | 3267649 B2 * | 3/2002 | ............ F16C 24/045 |

*Primary Examiner* — Phillip A Johnson
(74) *Attorney, Agent, or Firm* — The Webb Law Firm

(57) ABSTRACT

A bearing system for a turbocharger includes a bearing housing having a first end and a second end, with the bearing housing defining a central passageway. A first ball bearing and a second ball bearing are received by the bearing housing. The second ball bearing is spaced from the first ball bearing. The first and second ball bearings are each preloaded.

8 Claims, 5 Drawing Sheets

(56) References Cited

U.S. PATENT DOCUMENTS

| | | | |
|---|---|---|---|
| 4,798,523 A | | 1/1989 | Glaser et al. |
| 5,253,985 A | * | 10/1993 | Ruetz .................... F01D 25/164 |
| | | | 384/473 |
| 5,967,762 A | | 10/1999 | Keller et al. |
| 6,220,829 B1 | | 4/2001 | Thompson et al. |
| 6,478,553 B1 | | 11/2002 | Panos et al. |
| 6,739,845 B2 | | 5/2004 | Woollenweber |
| 7,371,011 B2 | | 5/2008 | McKeirnan, Jr. |
| 7,677,041 B2 | | 3/2010 | Woollenweber |
| 7,832,938 B2 | | 11/2010 | McKeirnan, Jr. |
| 8,740,465 B2 | | 6/2014 | McKeirnan, Jr. |
| 2007/0036477 A1 | | 2/2007 | McKeirnan, Jr. |
| 2007/0183704 A1 | | 8/2007 | Umekawa |
| 2012/0144939 A1 | * | 6/2012 | Kullin .................... H01J 35/101 |
| | | | 74/25 |
| 2012/0282078 A1 | | 11/2012 | Marsal et al. |
| 2012/0328225 A1 | * | 12/2012 | Ito ........................ F16C 25/083 |
| | | | 384/463 |

* cited by examiner

TURBOCHARGER DUAL BALL BEARING SYSTEM

CROSS-REFERENCE TO RELATED APPLICATION

This application claims priority to U.S. Provisional Application Ser. No. 61/900,088, filed Nov. 5, 2013, which is hereby incorporated by reference in its entirety.

BACKGROUND OF THE INVENTION

Field of the Invention

The present invention relates, in general, to a ball bearing system and, in particular, to a dual ball bearing system for a turbocharger.

Description of Related Art

Current turbochargers operate at very high rotating speeds and require a bearing system that can support the rotating group with low mechanical loss and that is capable of high axial and radial loads. Traditional journal and thrust bearings accomplish this task, but are limited in their ultimate load capacity and often have high mechanical drag. These bearings fail to perform well in marginal lube conditions and can often be difficult to assemble. There is a current need for a bearing system that reduces frictional losses and provides durability to a high speed turbocharger rotor. There is also a current need for a bearing system that can provide these features, is easily assembled, and is easily built into a turbocharger.

SUMMARY OF THE INVENTION

In one aspect, a bearing system for a turbocharger includes a bearing housing having a first end and a second end with the bearing housing defining a central passageway. The bearing system includes a first ball bearing received by the bearing housing, and a second ball bearing received by the bearing housing. The second ball bearing is spaced from the first ball bearing. The first and second ball bearings are each preloaded.

The bearing housing may include a first shoulder positioned adjacent to the first ball bearing and a second shoulder positioned adjacent to the second ball bearing. The bearing system may include a first biasing arrangement positioned between the first shoulder and the first ball bearing and a second biasing arrangement positioned between the second shoulder and the second ball bearing, with the first and second biasing arrangements each configured to preload the first and second ball bearings, respectively. The first and second biasing arrangements may be a spring. The spring may be a Belleville washer. In other aspects, the first and second biasing arrangements may be oil pressure provided via first and second oil ports, respectively. The biasing arrangement may provide a squeeze film damper. The first ball bearing may be an angular contact bearing having a first inner race, a first outer race, and a plurality of first bearing balls, and the second ball bearing may be an angular contact bearing having a second inner race, a second outer race, and a plurality of second bearing balls. The first ball bearing may only be configured to accept thrust in a first direction and the second ball bearing may only be configured to accept thrust in a second direction opposite the first direction. The first biasing arrangement may bias the first outer race of the first ball bearing and the second biasing arrangement may bias the second outer race of the second ball bearing. A first retainer may secure the first ball bearing within the bearing housing, and a second retainer may secure the second ball bearing within the bearing housing. The first ball bearing may be positioned between the first retainer and the first shoulder, and the second ball bearing may be positioned between the second retainer and the second shoulder. A spacer may be positioned between the first and second ball bearings.

In another aspect, a turbocharger includes a turbocharger housing, a shaft received by the turbocharger housing with the shaft having a compressor wheel adjacent to a first end of the shaft and a turbine wheel adjacent to a second end of the shaft, and a bearing system received by the turbocharger housing. The bearing system includes a bearing housing having a first end and a second end with the bearing housing defining a central passageway, a first ball bearing received by the bearing housing, and a second ball bearing received by the bearing housing. The second ball bearing is spaced from the first ball bearing. The first ball bearing is preloaded via a first biasing arrangement and the second ball bearing is preloaded via a second biasing arrangement.

The first and second biasing arrangements may each be a spring. The first and second biasing arrangements may each be embodied as oil pressure provided via first and second oil ports, respectively. The first ball bearing may be an angular contact bearing having a first inner race, a first outer race, and a plurality of first bearing balls, and the second ball bearing may be an angular contact bearing having a second inner race, a second outer race, and a plurality of second bearing balls. The first ball bearing may only be configured to accept thrust in a first direction and the second ball bearing may only be configured to accept thrust in a second direction opposite the first direction. A first retainer may secure the first ball bearing within the bearing housing, and a second retainer may secure the second ball bearing within the bearing housing. A spacer may be positioned between the first and second ball bearing, the shaft extending through the spacer.

These and other features and characteristics of the bearing system will become more apparent upon consideration of the following description with reference to the accompanying drawings, all of which form a part of this specification, wherein like reference numerals designate corresponding parts in the various figures. It is to be expressly understood, however, that the drawings are for the purposes of illustration and description only and are not intended as a definition of the limits of the invention. As used in the specification, the singular form of "a", "an", and "the" include plural referents unless the context clearly dictates otherwise.

DESCRIPTION OF THE INVENTION

Figure 1:
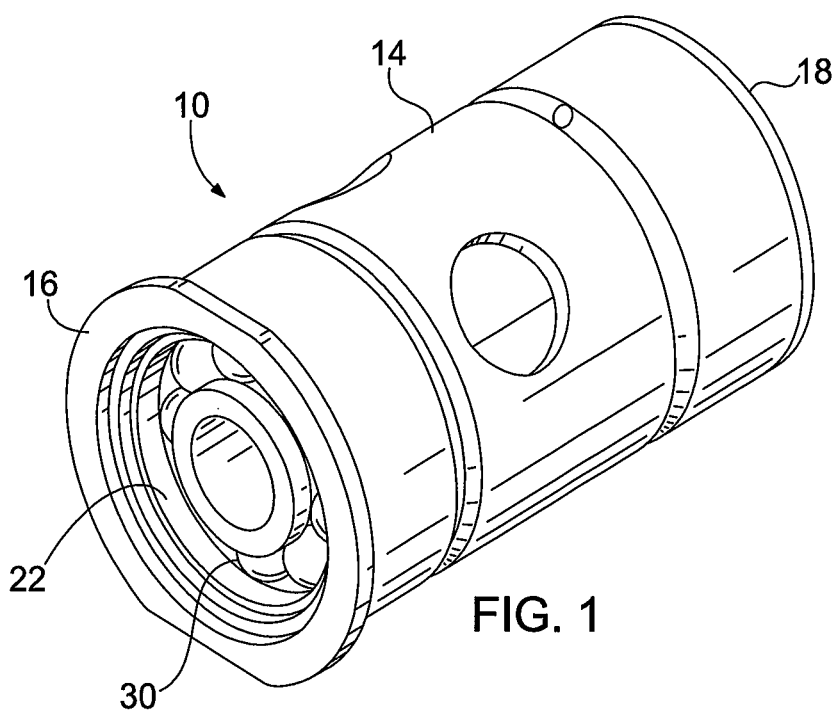
FIG. 1 is a perspective view of a bearing system in accordance with one aspect of the present invention.

For purposes of the description hereinafter, any directional terms and derivatives thereof shall relate to the invention as it is oriented in the drawings. However, it is to be understood that the invention may assume alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

The present invention is directed to, in general, a bearing system and, in particular, a dual ball bearing system for a turbocharger. Certain preferred and non-limiting aspects of the components of the bearing system are illustrated in FIGS. 1-4.

Figure 2:
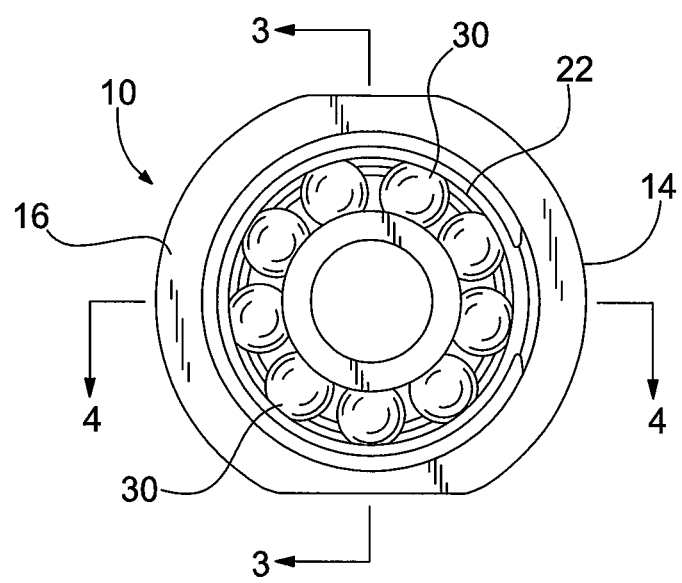
FIG. 2 is a front view of the bearing system of FIG. 1.
Figure 5:
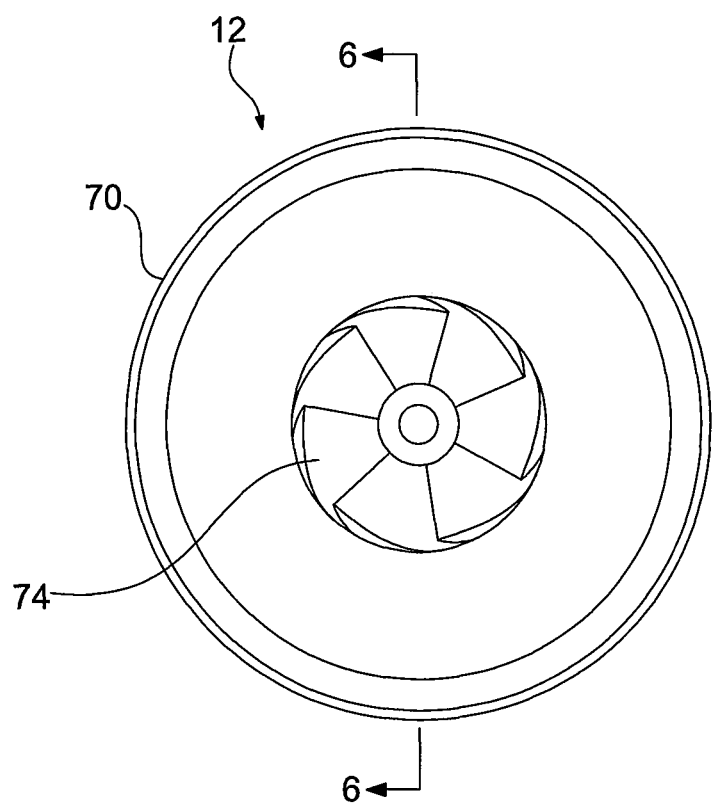
FIG. 5 is a front view of a turbocharger in accordance with one aspect of the present invention.
Figure 6:
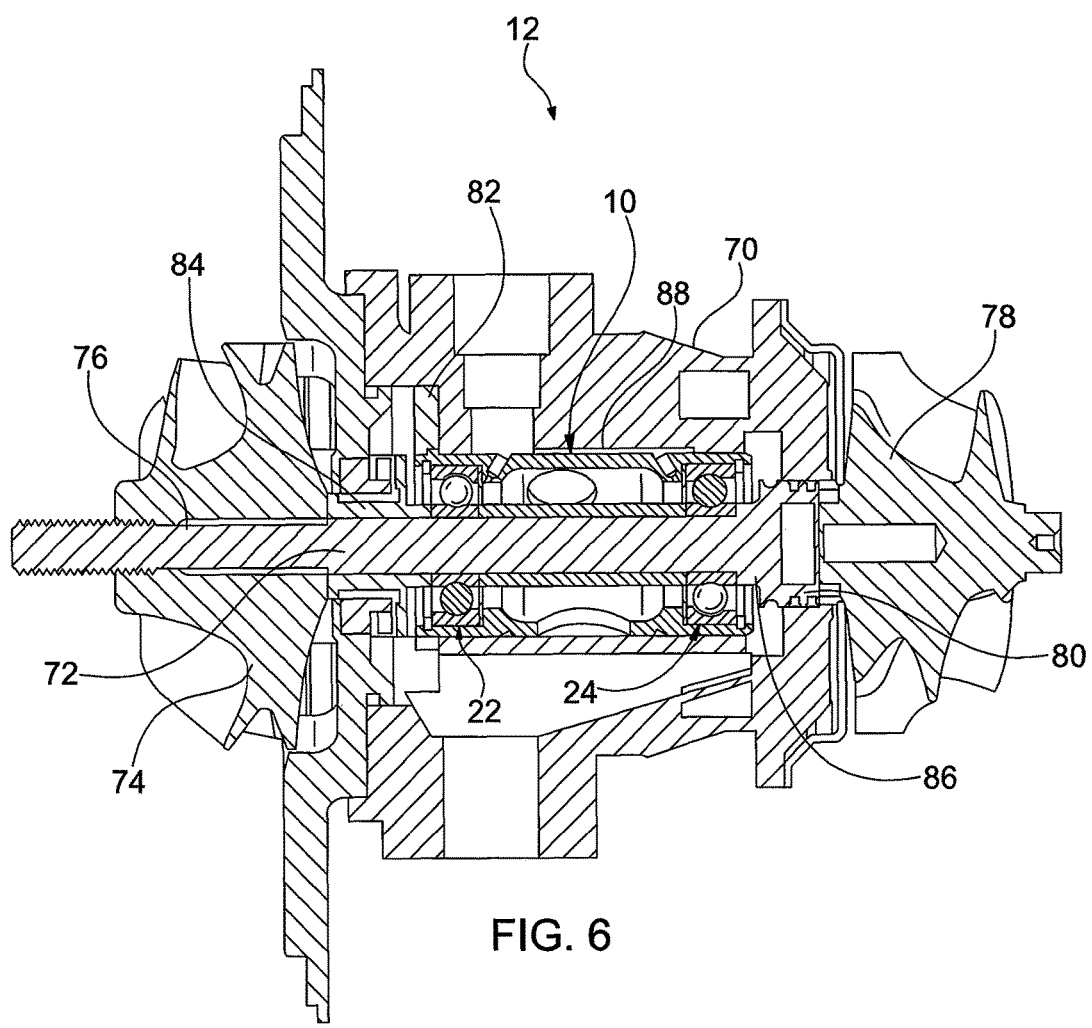
FIG. 6 is a cross-sectional view of the turbocharger taken along line 6-6 in FIG. 5.

Referring to FIGS. 1-2, a bearing system 10 is illustrated. This bearing system 10 may be used in connection with a turbocharger 12 as shown in FIGS. 5 and 6 and discussed in more detail below. The bearing system 10 includes a bearing housing 14 having a first end 16 and a second end 18. In one aspect, the bearing housing 14 may be cylindrical. However, other suitable cross-sectional shapes of the bearing housing 14 may be utilized.

Figure 3:
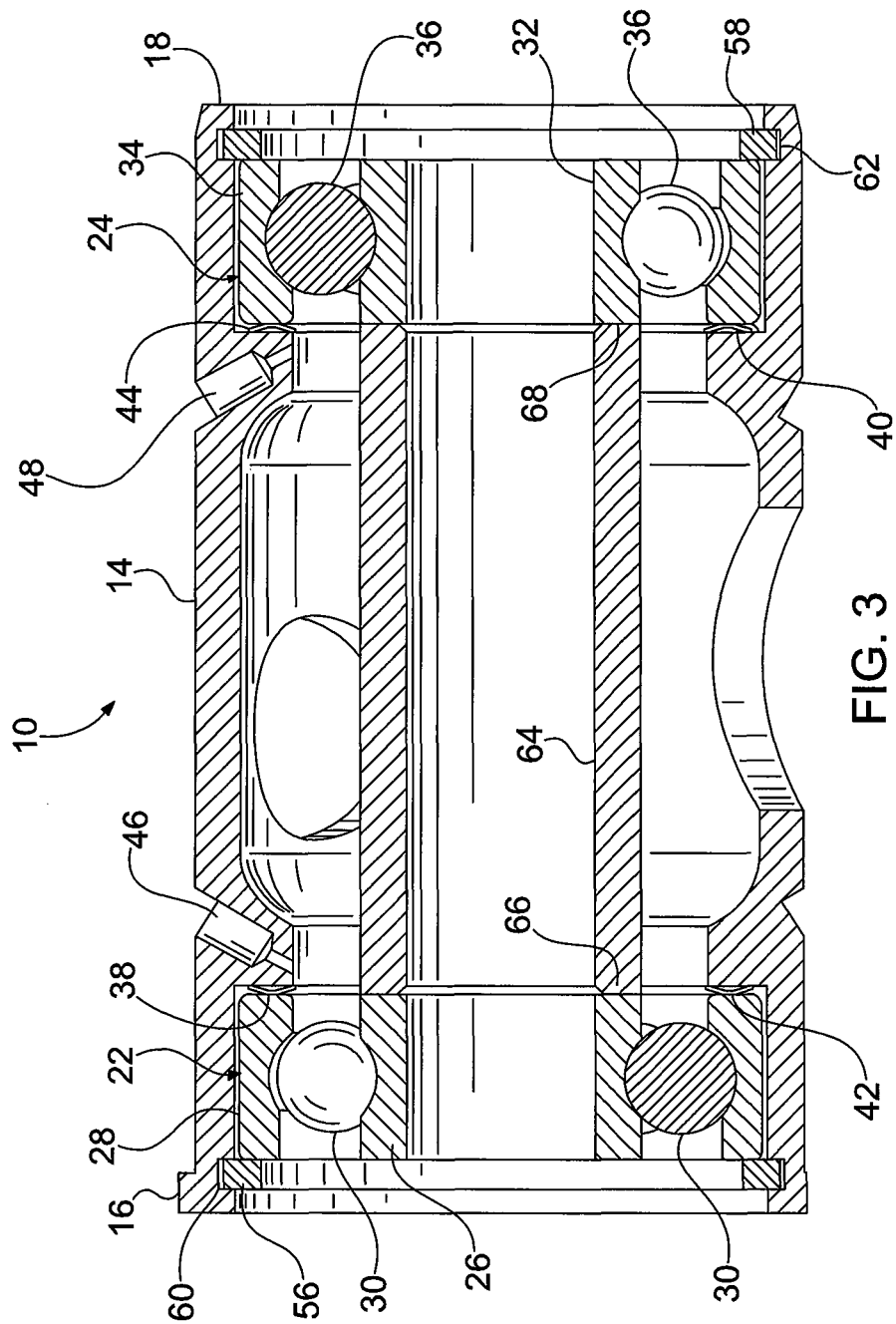
FIG. 3 is cross-sectional view of the bearing system of FIG. 1 taken along line 3-3 in FIG. 2.
Figure 4:
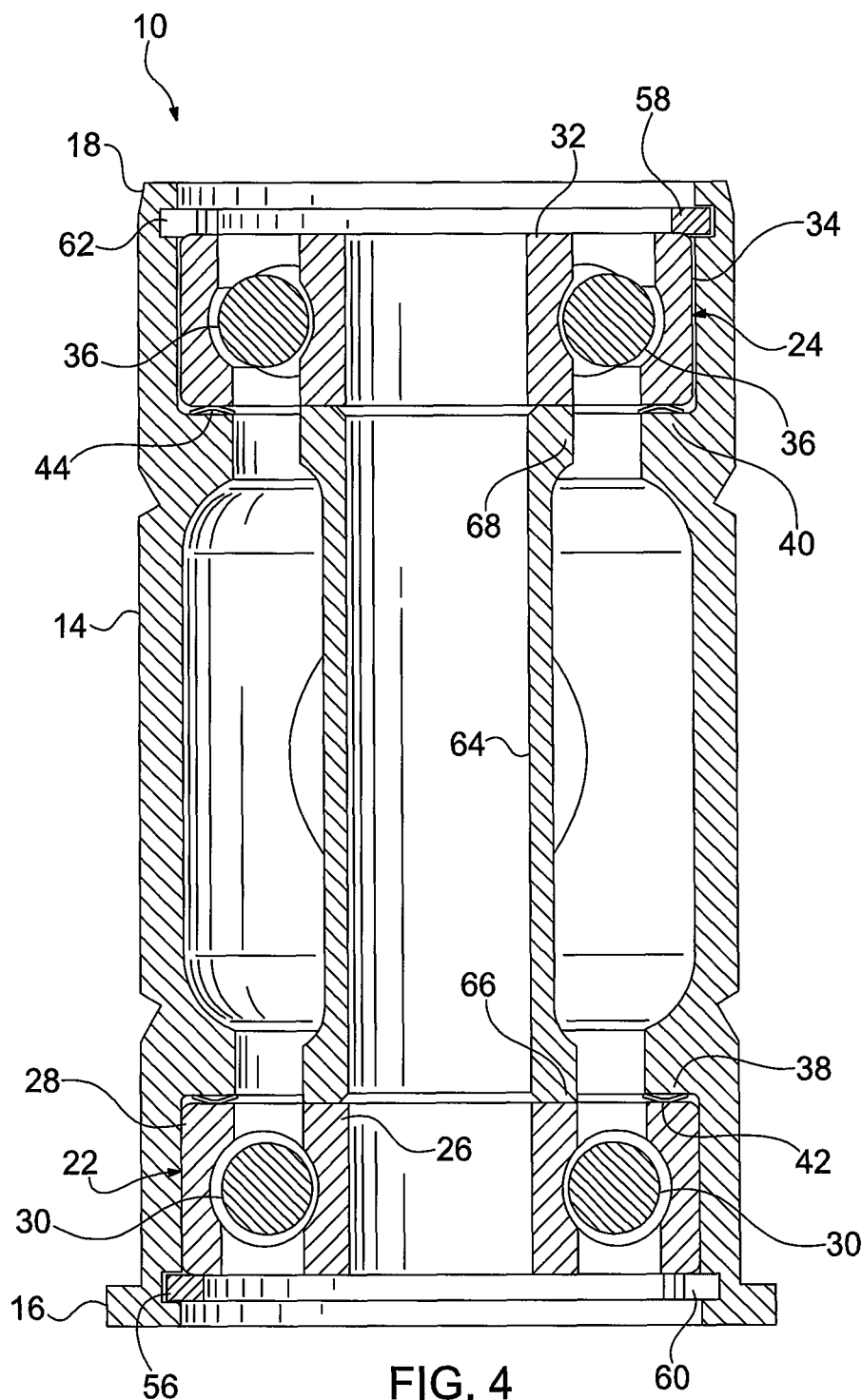
FIG. 4 is a cross-sectional view of the bearing system of FIG. 1 taken along line 4-4 in FIG. 2.

Referring to FIGS. 3-4, the bearing system 10 includes a first ball bearing 22 and a second ball bearing 24 positioned within the bearing housing 14. The first ball bearing 22 is positioned adjacent to the first end 16 of the bearing housing 14 and the second ball bearing 24 is spaced from the first ball bearing 22 and positioned adjacent to the second end 18 of the bearing housing 14, although other suitable positioning of the ball bearings 22, 24 may be utilized. The ball bearings 22, 24 are each angular contact ball bearings, although other suitable ball bearings may be utilized. The first ball bearing 22 includes a first inner race 26, a first outer race 28, and a plurality of first bearing balls 30 positioned between the first inner race 26 and the first outer race 28. The first bearing balls 30 may be clearance fit between the first inner race 26 and the first outer race 28. The second ball bearing 24 includes a second inner race 32, a second outer race 34, and a plurality of second bearing balls 36 positioned between the second inner race 32 and the second outer race 34. The second bearing balls 36 may be clearance fit between the second inner race 32 and the second outer race 34. The first and second bearing balls 30, 36 may be ceramic, although other suitable bearing balls may be utilized. The first and second ball bearings 22, 24 are arranged in a duplex back-to-back, although other suitable configurations may be utilized. The first ball bearing 22 is configured to receive thrust in a first direction and the second ball bearing 24 is configured to receive thrust in a second direction opposite the first direction. The first direction extends from the first end 16 of the bearing housing 14 to the second end 18 of the bearing housing 14. The first and second ball bearings 22, 24 may each be clearance fit into the bearing housing 14 with the first and second ball bearings 22, 24 assembled prior to insertion into the bearing housing 14.

Referring again to FIGS. 3-4, the bearing housing 14 includes a first shoulder 38 and a second shoulder 40 each extending radially inward. The first and second shoulders 38, 40 are each configured to receive the first and second ball bearings 22, 24, respectively. The first shoulder 38 is positioned near the first end 16 of the bearing housing 14 and the second shoulder 40 is positioned near the second end 18 of the bearing housing 14. The first and second ball bearings 22, 24 are each preloaded by a first biasing arrangement 42 and a second biasing arrangement 44, respectively. The first biasing arrangement 42 is positioned between the first shoulder 38 and the first ball bearing 22. The second biasing arrangement 44 is positioned between the second shoulder 40 and the second ball bearing 24. In one non-limiting aspect, the first and second biasing arrangements 42, 44 are each a spring, such as a Belleville washer, although other suitable springs may be utilized. In other non-limiting aspects, the first and second biasing arrangements 42, 44 are each provided by oil pressure supplied by a first oil port 46 and a second oil port 48, respectively. The oil pressure supplied by the first and second oil ports 46, 48 may also provide a squeeze film damper due to the clearance fit between the first and second ball bearings 22, 24 and the bearing housing 14. The first oil port 46 is defined by the bearing housing 14 positioned adjacent to the first shoulder 38, and the second oil port 48 is defined by the bearing housing 14 and positioned adjacent to the second shoulder 40, although other suitable positions for the first and second oil ports 46, 48 may be utilized.

The first and second ball bearings 22, 24 are each secured within the bearing housing 14 by first and second retainers 56, 58, respectively. The first and second retainers 56, 58 may be retainer rings, although other suitable retaining arrangements may be utilized. More specifically, the first retainer 56 is received by a first retainer recess 60 defined by the bearing housing 14 and the second retainer 58 is received by a second retainer recess 62 defined by the bearing housing 14. The first retainer 56 engages the first outer race 28 of the first ball bearing 22 with the first outer race 28 positioned between the first retainer 56 and the first biasing arrangement 42, which is seated on the first shoulder 38. In the same manner, the second retainer 58 engages the second outer race 34 of the second ball bearing 24 with the second outer race 34 positioned between the second retainer 58 and the second biasing arrangement 44. The first and second ball bearings 22, 24 are installed by first positioning the first and second biasing arrangements 42, 44 against the respective shoulders 38, 40 and then positioning the first and second ball bearings 22, 24 within the bearing housing 14 such that the first and second ball bearings 22, 24 engage the respective first and second biasing arrangements 42, 44. When the first and second retainers 56, 58 are installed, the first and second biasing arrangements 42, 44 are engaged and biased to provide a predetermined preload to the first and second ball bearings 22, 24. The preload for the first and second ball bearings 22, 24 may be determined based on the design of the ball bearings 22, 24 and the intended operating conditions of the ball bearings 22, 24.

Referring still to FIGS. 3-4, the bearing system 10 includes a spacer 64 received within the bearing housing 14 and positioned between the first and second ball bearings 22, 24. The spacer 64 has a first end 66 engaged with the first inner race 26 of the first ball bearing 22, and a second end 68 engaged with the second inner race 32 of the second ball bearing 24.

Referring to FIGS. 5-6, the bearing system 10 is shown incorporated within the turbocharger 12. The turbocharger 12 includes a turbocharger housing 70 that receives a shaft 72. The shaft 72 having a compressor wheel 74 secured to and positioned adjacent to a first end 76 of the shaft 72 and a turbine wheel 78 secured to and positioned adjacent to a second end 80 of the shaft 72. The bearing system 10 is received within the turbocharger housing 70 and secured by a retainer plate 82, although any other suitable securing arrangement may be utilized. Although not shown, the turbocharger 12 may include a compressor housing and turbine housing. The shaft 72 of the turbocharger 12 extends through and is received by the first ball bearing 22, the spacer 64, and the second ball bearing 24. As discussed above, the first and second retainers 56, 58 secure the first outer race 28 and the second outer race 34 of the first and second ball bearings 22, 24. The first inner race 26 and the second inner race 32 of the first and second ball bearings 22, 24 are each clamped between the spacer 64 and a clamp ring 84 or a portion 86 of the shaft 72. The turbocharger housing 70 defines an oil feed groove 88 that is in fluid communication with the first and second oil ports 46, 48.

While various aspects of the bearing system were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the specification, and all changes to the invention that fall within the meaning and the range of equivalency of the specification are to be embraced within its scope.

The invention claimed is:

1. A bearing system for a turbocharger comprising:
   a bearing housing having a first end and a second end, the bearing housing defining a central passageway and including a first shoulder and a second shoulder, the bearing housing defining first and second oil ports;
   a first ball bearing received by the bearing housing, the first ball bearing comprising an angular contact bearing having a first inner race, a first outer race, and a plurality of first bearing balls, the first ball bearing is positioned adjacent to the first shoulder;
   a second ball bearing received by the bearing housing, the second ball bearing spaced from the first ball bearing, the second ball bearing comprising an angular contact bearing having a second inner race, a second outer race, and a plurality of second bearing balls, the second ball bearing is positioned adjacent to the second shoulder;
   a first spring positioned between the first shoulder and the first outer race of the first ball bearing and a second spring positioned between the second shoulder and the second outer race of the second ball bearing, the first and second springs each configured to preload the first and second ball bearings, respectively; and
   a spacer positioned between the first and second ball bearings and engaging the first inner race and the second inner race,
   wherein the first and second ball bearings are clearance fit within the bearing housing, the first and second oil ports are configured to provide a squeeze film damper between the first and second ball bearings and the housing, respectively.

2. The bearing system of claim 1, wherein the spring is a Belleville washer.

3. The bearing system of claim 1, wherein the first ball bearing is only configured to accept thrust in a first direction and the second ball bearing is only configured to accept thrust in a second direction opposite the first direction.

4. The bearing system of claim 1, further comprising a first retainer securing the first ball bearing within the bearing housing, and a second retainer securing the second ball bearing within the bearing housing.

5. The bearing system of claim 4, wherein the first ball bearing is positioned between the first retainer and the first shoulder, and the second ball bearing is positioned between the second retainer and the second shoulder.

6. A turbocharger comprising:
   a turbocharger housing;
   a shaft received by the turbocharger housing, the shaft having a compressor wheel adjacent to a first end of the shaft and a turbine wheel adjacent to a second end of the shaft;
   a bearing system received by the turbocharger housing, the bearing system comprising:
      a bearing housing having a first end and a second end, the bearing housing defining a central passageway and including a first shoulder positioned adjacent to the first ball bearing and a second shoulder positioned adjacent to the second ball bearing, the bearing housing defining first and second oil ports;
      a first ball bearing received by the bearing housing, the first ball bearing comprising an angular contact bearing having a first inner race, a first outer race, and a plurality of first bearing balls;
      a second ball bearing received by the bearing housing, the second ball bearing spaced from the first ball bearing, the second ball bearing comprising an angular contact bearing having a second inner race, a second outer race, and a plurality of second bearing balls;
      a first spring positioned between the first shoulder and the first outer race of the first ball bearing and a second spring positioned between the second shoulder and the second outer race of the second ball bearing, the first and second springs each configured to preload the first and second ball bearings, respectively; and
      a spacer positioned between the first and second ball bearings and engaging the first inner race and the second inner race, the shaft extending through the spacer,
      wherein the first and second ball bearings are clearance fit within the bearing housing, the first and second oil ports are configured to provide a squeeze film damper between the first and second ball bearings and the housing, respectively.

7. The turbocharger of claim 6, wherein the first ball bearing is only configured to accept thrust in a first direction and the second ball bearing is only configured to accept thrust in a second direction opposite the first direction.

8. The turbocharger of claim 6, further comprising a first retainer securing the first ball bearing within the bearing housing, and a second retainer securing the second ball bearing within the bearing housing.

* * * * *